US006952902B2

(12) United States Patent
Yaros

(10) Patent No.: US 6,952,902 B2
(45) Date of Patent: Oct. 11, 2005

(54) ATTACHMENT PLATE

(75) Inventor: Richard Yaros, Pinconning, MI (US)

(73) Assignee: Pinconning Metals, Inc., Pinconning, MI (US)

( * ) Notice: Subject to any disclaimer, the term of this patent is extended or adjusted under 35 U.S.C. 154(b) by 51 days.

(21) Appl. No.: 10/234,894

(22) Filed: Sep. 4, 2002

(65) Prior Publication Data
US 2004/0040243 A1 Mar. 4, 2004

(51) Int. Cl.[7] .............................. E04D 3/00; E04D 3/24
(52) U.S. Cl. ............................ 52/409; 52/410; 52/413; 52/411
(58) Field of Search .................... 52/410, 408, 409, 52/412, 411, 413; 411/531, 533, 538, 539, 541, 545

(56) References Cited

U.S. PATENT DOCUMENTS

| 4,520,606 A | * | 6/1985 | Francovitch | ................. 52/410 |
| 4,631,433 A | * | 12/1986 | Stokes | ......................... 310/89 |
| 4,726,164 A | | 2/1988 | Reinwall et al. | |
| 4,763,456 A | * | 8/1988 | Giannuzzi | .................... 52/410 |
| 4,787,188 A | | 11/1988 | Murphy | |
| 4,945,699 A | | 8/1990 | Murphy | |
| 4,987,714 A | | 1/1991 | Lemke | |
| 5,102,275 A | * | 4/1992 | Hulsey | ....................... 411/134 |
| 5,803,693 A | * | 9/1998 | Choiniere et al. | .......... 411/537 |
| 5,882,043 A | | 3/1999 | Murphy et al. | |
| 5,915,903 A | * | 6/1999 | Osterle et al. | .............. 411/531 |
| 5,930,969 A | * | 8/1999 | Mayle et al. | ................. 52/545 |
| 5,951,225 A | | 9/1999 | Orterle et al. | |
| 6,205,730 B1 | * | 3/2001 | Hasan et al. | .................. 52/408 |
| 6,233,889 B1 | | 5/2001 | Husley | |
| 6,250,034 B1 | * | 6/2001 | Hulsey | ........................ 52/410 |
| D446,319 S | | 8/2001 | Rubenacker | |
| 6,282,857 B1 | * | 9/2001 | Rubenacker | ................. 52/410 |
| 6,427,412 B1 | * | 8/2002 | Mayle et al. | ................. 52/545 |
| 6,640,511 B1 | * | 11/2003 | Link | ........................... 52/410 |
| 6,665,991 B2 | * | 12/2003 | Hasan | ......................... 52/410 |

* cited by examiner

Primary Examiner—Jeanette E. Chapman
(74) Attorney, Agent, or Firm—Brooks Kushman P.C.

(57) ABSTRACT

An attachment plate for securing a roof membrane to a roof deck comprising a generally planar contact surface, at least one aperture for receiving a fastener for securing the plate to the deck with the membrane therebetween, a first reinforcing rib formed by a continuous portion of the plate being raised upward from the contacting surface of the plate and extending at least around the perimeter of the plate, and a gripping edge extending downwardly at the perimeter of the plate from the first reinforcing rib to a plane below the plane in the contacting surface. The plate may be generally square with the aperture located at the center of the plate, and may include a second reinforcing rib which intersects the first reinforcing rib at about the center of each of the sides of the first reinforcing rib.

9 Claims, 5 Drawing Sheets

Bottom View (formed)

ATTACHMENT PLATE

BACKGROUND OF THE INVENTION

1. Field of the Invention

This invention relates to attachment plates for securing a membrane to a roof.

2. Background Art

Attachment plates have been used previously to attach membranes to substrates such as a roof deck. The attachment plate is generally placed atop the membrane when the membrane is laid over the roof deck, and a fastener is inserted through an opening in the plate, through the membrane, and into the roof deck to secure the membrane to the roof deck.

Existing attachment plates typically have one or more prongs which extend downward from the roof plate to engage and compress the membrane when the attachment plate is installed in place atop the membrane. However, these prongs may puncture the membrane, either during installation, or when the membrane is subsequently subjected to shear forces which result from upward wind pressure.

SUMMARY OF THE INVENTION

The present invention provides an attachment plate for securing a roof membrane to a roof deck, the plate comprising a generally planar contact surface, at least one aperture for receiving a fastener for securing the plate to the deck with the membrane therebetween, a first reinforcing rib formed by a continuous portion of the plate being raised upward from the contacting surface of the plate and extending at least around the perimeter of the plate, and a gripping edge extending downwardly at the perimeter of the plate from the first reinforcing rib to a plane below the plane of the contacting surface. When the attachment plate is mounted on the roof deck by securing a fastener through the plate aperture, through the membrane, and into the roof deck, the contacting surface of the plate is pressed into contact with the membrane, and the gripping edge of the plate extends downward into, and compresses, the membrane at the periphery of the plate.

BRIEF DESCRIPTION OF THE DRAWINGS

FIG. 1B shows a side cross-sectional view of the embodiment of FIG. 1a;

FIG. 2B shows a side cross-sectional view of the embodiment of FIG. 2a;

FIG. 3B shows a bottom view of the embodiment of FIG. 3a;

FIG. 3C shows a side cross-sectional view of the embodiment of FIG. 3a;

FIG. 3D shows a side view of the embodiment of FIG. 3a;

FIG. 4B shows a bottom view of the embodiment of FIG. 4a;

FIG. 4C shows a side cross-sectional view of the embodiment of FIG. 4a;

FIG. 4D shows a side view of the embodiment of FIG. 4a;

FIG. 5B shows a bottom view of the embodiment of FIG. 5a;

FIG. 5C shows a side cross-sectional view of the embodiment of FIG. 5a;

FIG. 5D shows a side view of the embodiment of FIG. 5a; and

DETAILED DESCRIPTION OF THE PREFERRED EMBODIMENT

Figure 1A:
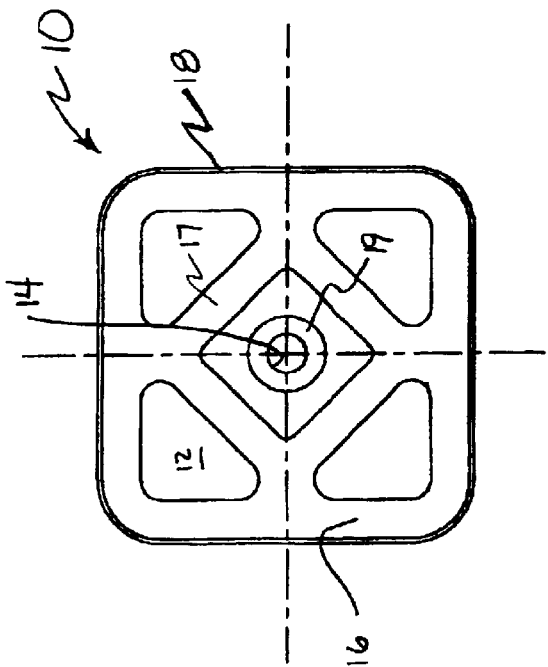
FIG. 1A shows a bottom view of one embodiment of the attachment plate of the present invention.
Figure 1B:
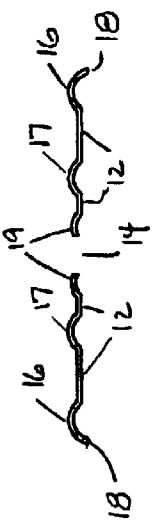

Referring now to the drawings, FIGS. 1a–b illustrate an attachment plate 10, which is one embodiment of the present invention. Attachment plate 10 includes a generally planar contact surface 12, an aperture 14, located at the center of the plate 10 for receiving a fastener for securing the plate atop a flexible membrane on a roof deck. A first reinforcing rib 16 comprising a raised portion of the plate, extends around the perimeter of the plate 10. A gripping edge 18 extends downwardly at the perimeter of the plate from the first reinforcing rib 16 to a plane below the plane of the contact surface 12.

In this embodiment, plate 10 also includes a second reinforcing rib 17 which further strengthens the plate 10. This embodiment also may include a raised panel 19 which provides a platform for receiving the contacting surface of the head of the fastener when the fastener is installed through the aperture 14, through the membrane, and into the roof deck.

When installed using an appropriate fastener, such as a wood screw [are other fasteners typically used?], the fastener, being mounted into the roof deck, exerts a downward clamping force on the attachment plate, urging the contacting surface 12 of the plate into contact with the roof membrane. The gripping edge 18 compresses the membrane thereby preventing the membrane from sliding between the attachment plate and the roof deck when the membrane is subjected to shear forces, such a by updrafts. The continuous perimeter gripping edge tends to distribute the shear forces, thereby reducing the likelihood that a sheer force will stretch the membrane and tear it at the point where the fastener pierces the membrane.

In the particular embodiment shown in FIGS. 1a and 1b, the attachment plate is generally square, with the aperture 14 located at the center of the plate. The first reinforcing rib 16 is also shaped as a square, since it extends around the perimeter of the plate. The second reinforcing rib 17 is also a square in this illustrated embodiment, rotated 45° relative to the first reinforcing rib 16 so that the corners of the square-shaped second reinforcing rib 17 intersect the first reinforcing rib 16 at about the center of each of the sides of the first reinforcing rib 16.

The attachment plate of the present invention is preferably stamped from a formable sheet material using a high speed stamping press, such as straight side press Model No. 660, available from Bliss Manufacturing, of Hastings, Mich. Of course, other types of stamping presses may be utilized to facilitate the attachment plates. Continuous coil or sheet metals, such as galvanized aluminum, galvanized steel, stainless steel, or other resilient, malleable material may be used. In one embodiment "AZ50" galvanized aluminum is utilized. Thicknesses in the range of 0.022 inches to 0.039 inches (plus/minus 0.003 inches) have been found suitable for fabricating attachment plates for use in securing conventional membranes fabricated of polyvinyl chloride (or other suitable synthetic rubber materials).

It will also be appreciated by those skilled in the art that attachment plate of the present invention may be made from other suitable resilient formable materials, such as plastic, or metal/plastic combinations, formed by other forming methods such as press molding, injection molding, extrusion, etc., without departing from the spirit of the present invention.

In the illustrated embodiments, the attachment plate is preferably about 2.5 inches square. Other sizes and shapes (such as rectangular, round, oval, etc.) may be employed, depending upon the type, thicknesses, and weight of the membrane, the type of roof deck, and other stress load conditions anticipated at a particular installation.

In one embodiment, the gripping edge is formed to extend downward about one tenth of an inch from the contact surface 12. The reinforcing ribs in the illustrated embodiments are preferably arcuate in shape in cross section, with the rib extending about 0.05 inches above the contact surface of the plate. Of course, reinforcing ribs having varying heights above the contact surface of the plate, and with other cross-sectional shapes may be employed so long as the ribs provide suitable strength and rigidity to the plate. In the embodiment illustrated in FIGS. 1a and 1b, the second reinforcing rib is formed as about a 1.125 inch square rotated at an angle of about 45° to the first reinforcing rib 16, and joined to the first reinforcing rib 16 at the center of the sidewalls of the rib.

Figure 2A:
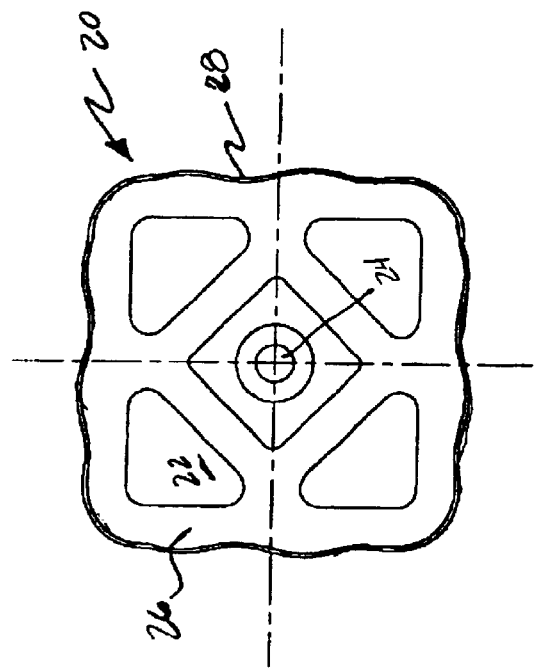
FIG. 2A shows a bottom view of a second embodiment of an attachment plate of the present invention.
Figure 2B:
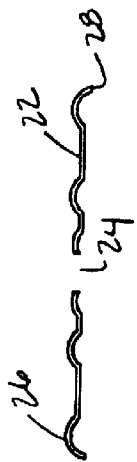

FIGS. 2a–2b illustrate another embodiment of an attachment plate 20 made in accordance with the present invention. In this embodiment, the attachment plate 20 is also preferably generally square, and includes a generally planar contact surface 22, an aperture 24 for receiving a fastener, a first reinforcing rib 26 which extends around the perimeter of the attachment plate 20, and a gripping edge 28 which extends downwardly from the reinforcing rib 26. In this embodiment, however, the gripping edge is shaped to be wavy (when viewed edge-on, such as in the bottom view of FIG. 2a) rather than a generally straight line edge (such as edge 18 of the embodiment of FIGS. 1a–1b). The wavy shaped gripping edge 28 thereby provides additional gripping surface area, so that the stresses incurred when the membrane is stretched are distributed over this greater area.

Figure 3A:
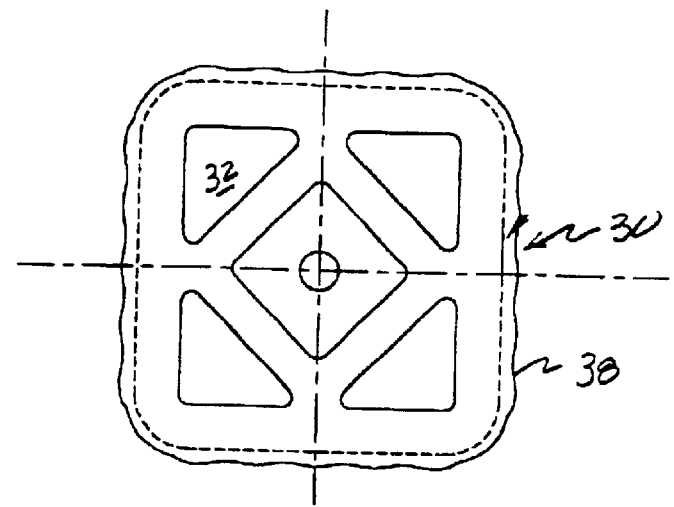
FIG. 3A shows a top view of a third embodiment of the attachment plate of the present invention.
Figure 3B:
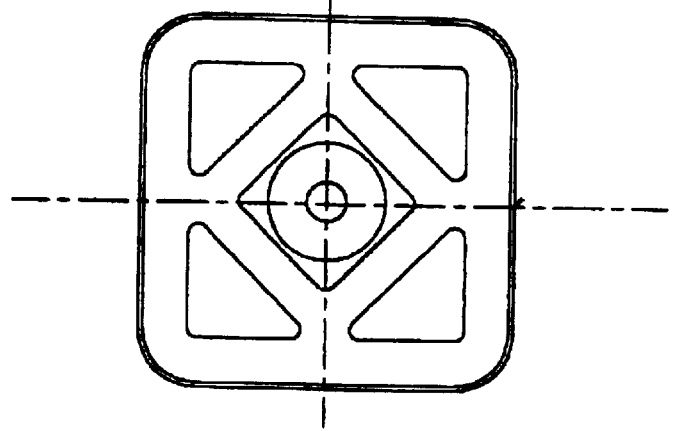
Figure 3C:
Figure 3D:
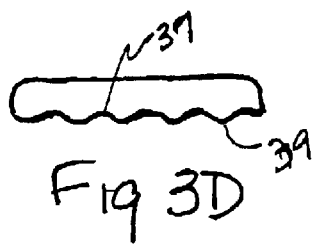
Figure 4A:
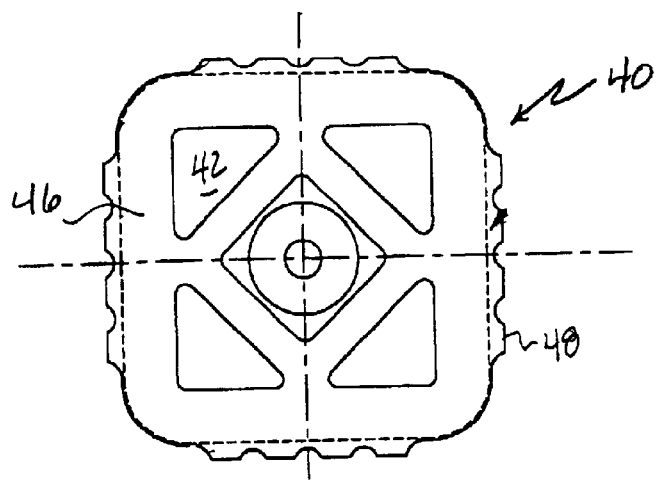
FIG. 4A shows a top view of a fourth embodiment of the attachment plate of the present invention.
Figure 4B:
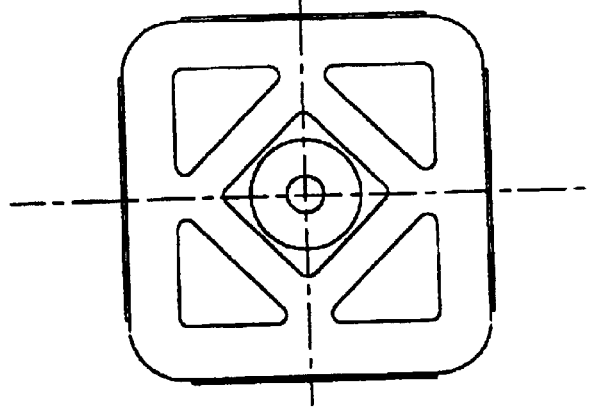
Figure 4C:
Figure 4D:
Figure 5A:
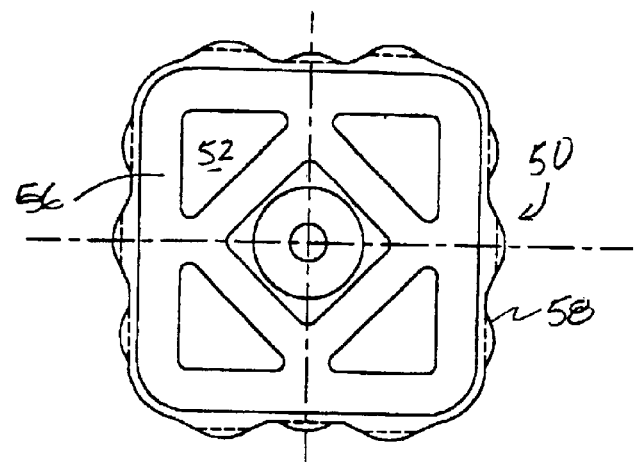
FIG. 5A shows a top view of a fifth embodiment of the attachment plate of the present invention.
Figure 5B:
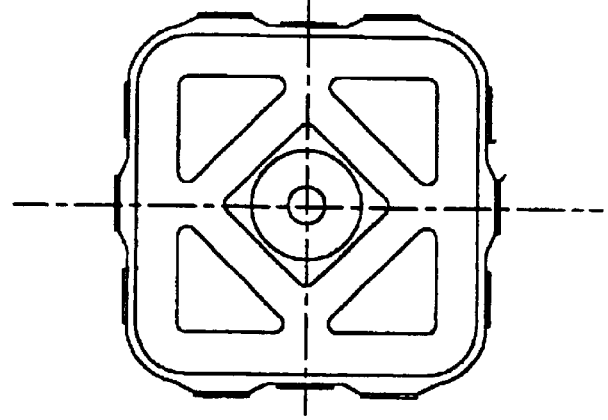
Figure 5C:
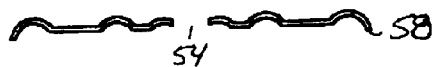
Figure 5D:

In yet another embodiment, illustrated in FIGS. 3a–3d, the attachment plate 30 may include a gripping edge which is formed as a wavy line when viewed from the side of the gripping edge, such as in FIG. 3d. When installed, gripping edge 38 compresses the membrane of variable amount at the contact points along the edge 38, since some portions of the edge 38 are relatively higher (at 37), while other portions of the gripping edge 38 are relatively lower (at 39), thereby compressing the membrane over a greater surface area than the alternative continuous depth gripping edge 18 of the embodiment illustrated in FIGS. 1a–1b.

It will be appreciated by those skilled in the art that the gripping edge of an attachment plate according to the present invention may alternatively be shaped to be generally wavy in both the vertical and horizontal directions (thereby combining the gripping edge features illustrated in the embodiments of FIGS. 2a–2b and 3a–3d) without departing from the spirit of the invention.

Another embodiment of an attachment plate 40 according to the present invention is illustrated in FIGS. 4a–4d. In this embodiment, the gripping edge 48 extends downwardly from the outside edge of the first reinforcing rib 46 in the shape in a series of teeth 49.

In another alternative embodiment, illustrated in FIGS. 5A–5D, the attachment plate 50 may include a gripping edge 58 which is shaped to be generally wavy when viewed from the top or bottom of a plate, and wherein the edge includes a plurality of gripping teeth 59 which extend downwardly from the outer perimeter of the first reinforcing rib 56 at various locations on the wavy edge 58.

Figure 6:
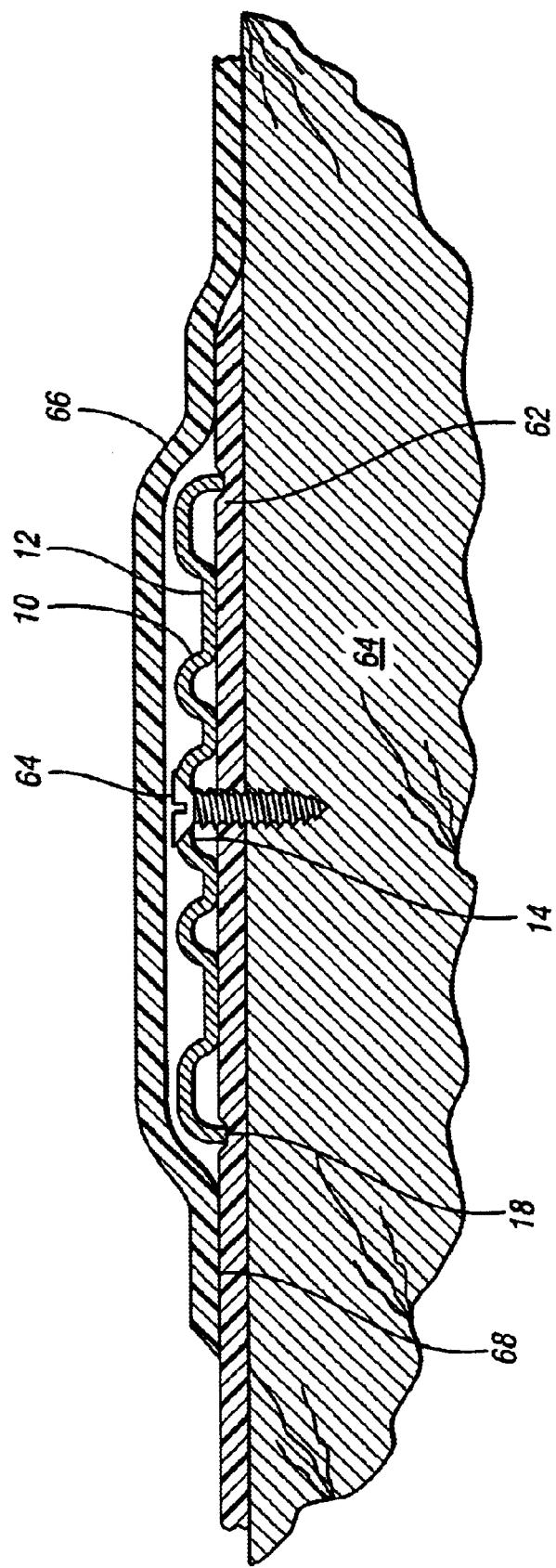
FIG. 6 shows a side cross-sectional view of an attachment plate of the present invention installed to secure a membrane to roof deck.

FIG. 6 illustrates, in side cross-sectional view, an attachment plate 10 according to the present invention installed atop a first membrane sheet 62. A threaded fastener 64 extends through the aperture 14 in the plate, pierces membrane 62, and pierces the wood roof deck 64, securing the first membrane sheet 62 between the attachment plate 10 and the roof deck 64. A second membrane 66 may be glued, sewn or otherwise secured to the first membrane at 68, and laid over one or more attachment plates at the edge of the first membrane 62, thereby defining a seam between roof membranes 62 and 68. The attachment plate is positioned with the contact surface 12 pressed into contact with the membrane 62 and the gripping edge 18 further compressing the membrane, each as a result of the gripping force of the fastener 64 on the plate, once the fastener is secured to the roof deck.

Each of the disclosed embodiments of the present invention provide an attachment plate which is simple to fabricate, yet strong, lightweight, and effective to provide attachment of a roof membrane, while substantially reducing or eliminating membrane tear problems experienced when using previous attachment plate designs.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A plate for attaching a roof membrane to a roof deck, the plate comprising:

a generally planar contact surface including at least one aperture for receiving a fastener for securing the plate to a roof deck;

a first reinforcing rib formed by a continuous portion of the plate being raised upward from the contacting surface of the plate and extending around the perimeter of the plate; and a gripping edge formed from the outer wall of the first reinforcing rib, the gripping edge extending downwardly from at least a portion of the perimeter of the plate to a plane below the plane of the contacting surface, whereby, when the attachment plate is mounted on a roof deck by securing the fastener through the plate aperture and into the roof deck with the roofing membrane located therebetween, the contacting surface of the plate is pressed into contact with the membrane, and the gripping edge of the plate extends downward into and compresses the membrane.

2. The attachment plate of claim 1 wherein the plate is rectangular in shape and wherein the gripping edge is continuous.

3. The attachment plate of claim 2 wherein the plate is shaped generally as a square.

4. The attachment plate of claim 1 wherein the gripping edge is generally wavy in the horizontal plane, thereby providing contact with the membrane along a generally wavy line.

5. The attachment plate of claim 1 wherein the plate includes one aperture located at the plate, and further including a second set of reinforcing ribs which surround the aperture.

6. The attachment plate of claim 5 wherein the second set of reinforcement ribs are interconnected with the first reinforcement ribs.

7. The attachment plate of claim 6 wherein the second set of reinforcing ribs form a square, and wherein the shape is rotated forty-five degrees in the plane of the contact surface and is interconnected with the first reinforcing rib at the center of each side of the first reinforcing rib.

8. The attachment plate of claim 1 wherein the gripping edge extends downwardly at the entire perimeter of the plate to a plane below the plane of the contacting surface.

9. The attachment plate of claim 1 wherein the gripping edge is generally wavy in the vertical plane, thereby compressing the roof membrane to varying depths around the perimeter of the plate.

* * * * *